W. P. ANDREW.
NUT LOCK.
APPLICATION FILED MAR. 12, 1919.

1,328,939. Patented Jan. 27, 1920.

Inventor
W. P. Andrew
By *(signature)*
Attorney

UNITED STATES PATENT OFFICE.

WILLIAM P. ANDREW, OF MOUNT PLEASANT, PENNSYLVANIA.

NUT-LOCK.

1,328,939.

Specification of Letters Patent.

Patented Jan. 27, 1920.

Application filed March 12, 1919. Serial No. 282,161.

*To all whom it may concern:*

Be it known that I, WILLIAM P. ANDREW, a citizen of the United States, residing at Mount Pleasant, in the county of Westmoreland and State of Pennsylvania, have invented certain new and useful Improvements in Nut-Locks, of which the following is a specification.

This invention relates to nut and bolt locks and it consists in the novel features hereinafter described and claimed.

An object of the invention is to provide a nut and bolt lock of simple and durable structure and which may be easily and quickly operated or manipulated to securely lock the nut with relation to the bolt.

A further object of the invention is to provide an improved form of locking member which is substantially housed and concealed within the bolt and which is provided with arm portions for embracing the nut, there being means provided for securing or fixing the locking member with relation to the bolt whereby the parts cannot become accidentally separated.

A still further object of the invention is to provide in a structure as stated means for imparting a double locking hold or strain upon the nut thereby rendering the structure thoroughly efficient and dependable.

In the accompanying drawing:—

Figure 1:
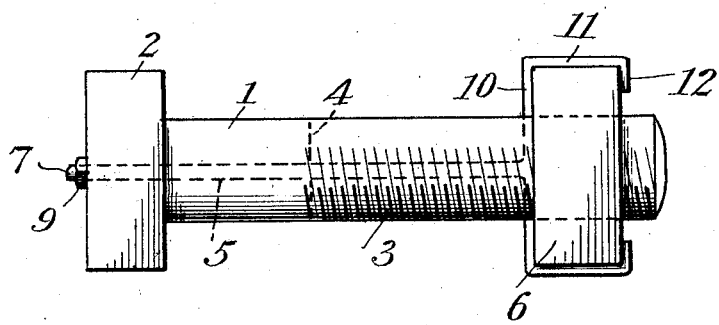
Figure 1 is a side elevation of the bolt and nut with the locking means applied.

As illustrated in the accompanying drawing the nut lock comprises a bolt 1 having at one end a head 2 as usual. The bolt is also provided along a portion of its length with a thread 3. A diametrically disposed slot 4 leads into the body of the bolt from the extremity of the threaded end thereof and the bolt is provided with a centrally located bore 5 which communicates at one end with the inner end of the slot and which traverses the longitudinal length of the body of the bolt side of the head 2 thereof.

A nut or bur 6 of usual pattern is adapted to be screwed upon the threaded end portion of the body of the bolt and in engagement with the thread 3 thereof.

Figure 2:
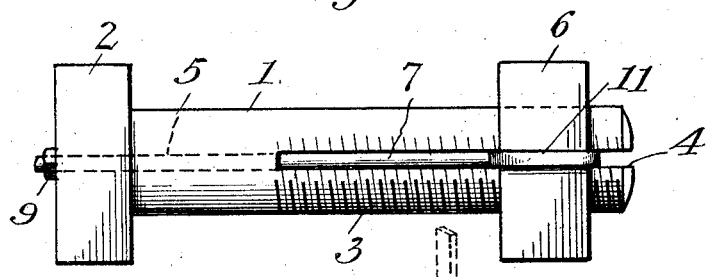
Fig. 2 is a similar view looking at the bolt and nut at the sides thereof which lie at a right angle to the sides as shown in Fig. 1.
Figure 3:
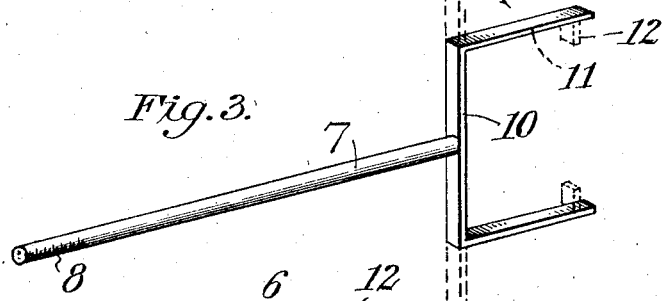
Fig. 3 is a perspective view of the locking member.
Figure 4:
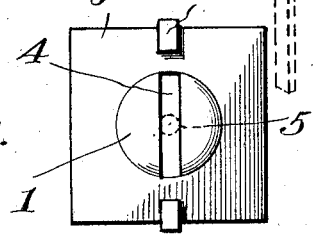
Fig. 4 is an end view of the bolt and nut and locking means.

The locking member comprises a stem 7 which may enter and slide along the bore 5 and angularly disposed arms 10 which pass transversely through the slot 4 and extend beyond the opposite sides of the body of the bolt. The portions 11 of the arms 10 may be bent along the side edges of the nut 6 and the extremities 12 may be bent against the outer face of the nut 6 when the parts are assembled and as shown in Figs. 1, 2 and 4 of the drawing. The stem 7 is provided with a thread 8 upon which a nut 9 may be screwed and the inner face of the nut 9 may bear against the outer surface of the head 2 when the parts are assembled and the nut 6 is locked in position upon the bolt 1.

In assembling the parts the locking member is inserted in the bolt 1 with the stem 7 in the bore 5 and the arms 10 in the slot 4. The nut 6 is then screwed in position upon the thread of the bolt 1 and the outer portions of the arms are bent over and around the edge portions of the nut 6. Therefore the said nut is securely held on the bolt 1 and the locking member is restrained against movement with relation to the bolt by the nut 9 which is screwed upon the thread 8 and against the outer face of the head of the bolt.

Having described the invention what is claimed is:—

1. A nut and bolt lock comprising a bolt having a slot leading in from one end thereof and a bore leading from said slot to the other end of the slot, a locking member having arms extending from the slot around the nut and a stem entering the bore and means for fixing the locking member with relation to the bolt.

2. A nut and bolt lock comprising a bolt having a diametrically disposed slot leading in from one end thereof and a bore leading from said slot to the other end of the bolt, and a locking member having arms extending from the slot around the nut and a stem entering the bore and a nut screwed upon the locking member for fixing the locking member with relation to the bolt.

In testimony whereof, I, affix my signature.

WILLIAM P. ANDREW.